United States Patent [19]

Araki et al.

[11] Patent Number: 4,755,030

[45] Date of Patent: Jul. 5, 1988

[54] LENS FOR FACSIMILE OR LASER PRINTER

[75] Inventors: Nobuhiro Araki, Yokohama; Koichi Kawata, Tama; Yukuo Sakagaito, Yokohama, all of Japan

[73] Assignee: Matsushita Electric Industrial Co., Ltd., Osaka, Japan

[21] Appl. No.: 927,452

[22] Filed: Nov. 6, 1986

[30] Foreign Application Priority Data

Nov. 8, 1985 [JP] Japan .................................. 60-251374
Jul. 10, 1986 [JP] Japan .................................. 61-162305

[51] Int. Cl.$^4$ .......................... G02B 9/60; G02B 26/08
[52] U.S. Cl. ...................................... 350/465; 350/6.1; 350/6.8
[58] Field of Search .......................... 350/6.1, 6.8, 465

[56] References Cited

FOREIGN PATENT DOCUMENTS 51-37245  3/1976  Japan.
55-18613  2/1980  Japan.
55-53308  4/1980  Japan.

*Primary Examiner*—John K. Corbin
*Assistant Examiner*—Scott J. Sugarman
*Attorney, Agent, or Firm*—Stevens, Davis, Miller & Mosher

[57] ABSTRACT

An f·θ lens system for use in an apparatus such as a facsimile, machine laser printer, and the like for scanning and recording by a laser beam. The lens system minimizes the amount of image distorted in the sagittal direction and provides equal angular scanning velocity, high brightness and high resolution. The lens system comprises five serially disposed lenses the first of which is a positive meniscus lens whose concave surface is directed toward the incident side of a laser beam, the second lens is a negative meniscus lens whose concave surface is directed toward the incident side of the laser beam, and the third to fifth lenses a positive meniscus lenses whose concave surfaces are directed toward the beam incident side, wherein these lenses satisfy particular conditions relating to the radii of curvatures of their surfaces, lens thickness, refractive indices and lens-to-lens distances.

2 Claims, 4 Drawing Sheets

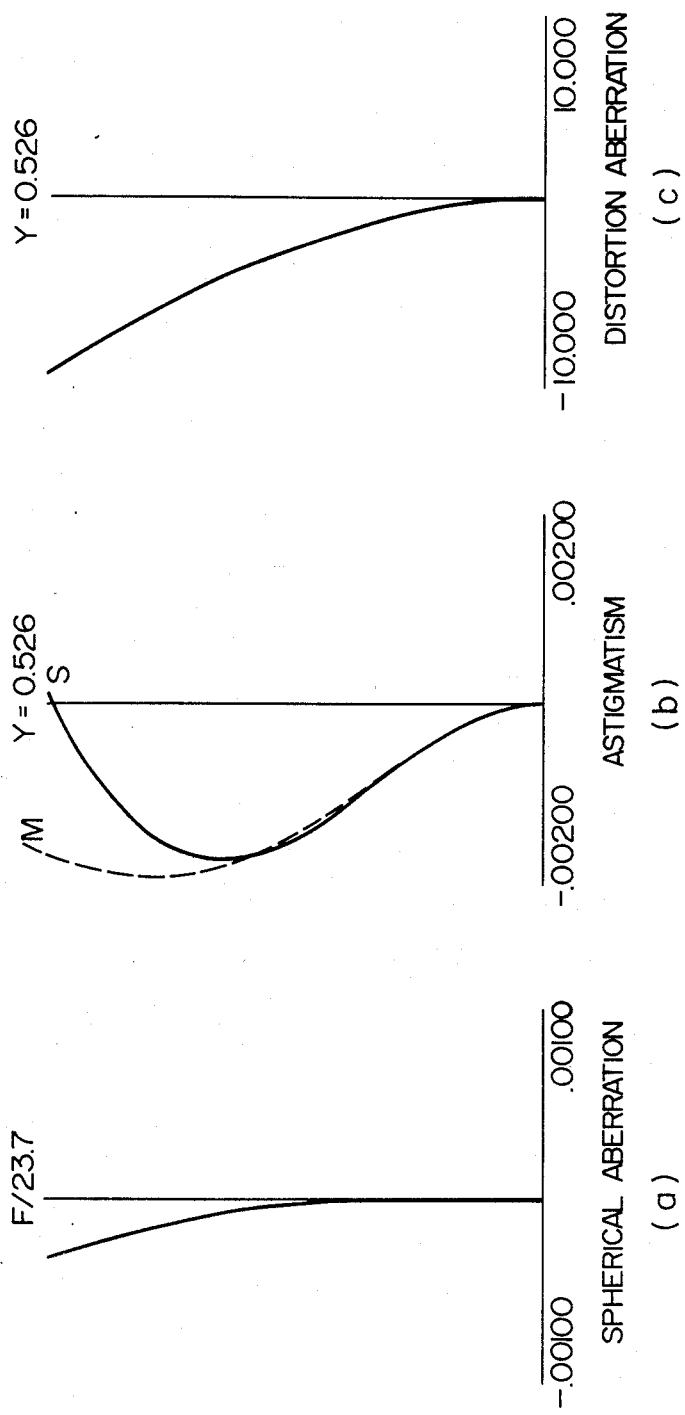

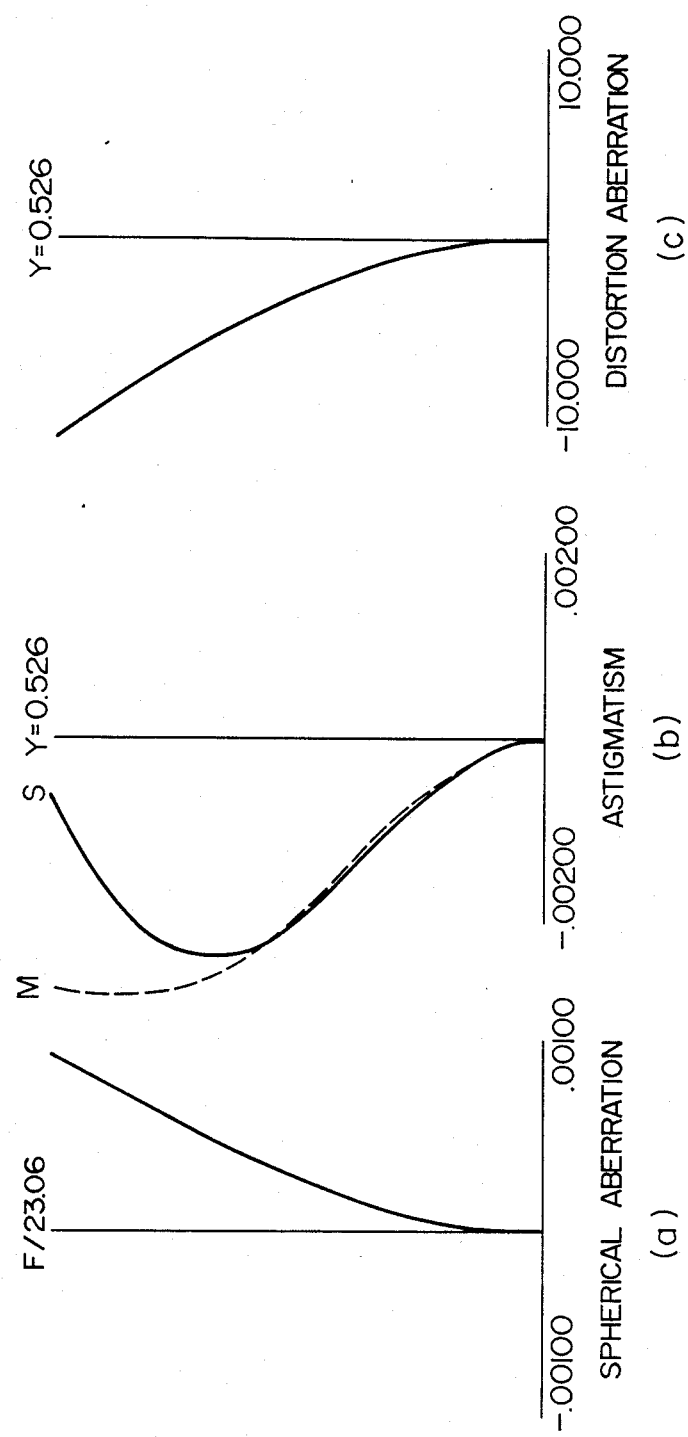

LENS FOR FACSIMILE OR LASER PRINTER

BACKGROUND OF THE INVENTION

The present invention relates to a lens for use in an apparatus such as a facsimile machine, laser printer, and the like for scanning and recording by a luminance-modulated laser beam and, more particularly, to an f-$\theta$ lens.

The f-$\theta$ lens is used in the printer and facsimile machine using a laser beam. The principle of this lens will be described with reference to FIG. 1. A laser beam emitted from a laser light source 11 is modulated by a modulator 12 in accordance with an image signal. The modulated beam is expanded by a beam expander 13. The expanded beam is then reflected by a reflecting mirror 14 and expanded again by another beam expander 13. A deflection angle $\theta$ is given to the expanded beam by a deflector such as a rotating polygonal mirror 15 or the like. The laser beam having the deflection angle $\theta$ is recorded through an f-$\theta$ lens (equal angular-velocity scanning lens) 16 having a focal distance f by use of a reflecting mirror 17 or focused onto a scanned surface 18 such as a reading medium or the like. The f-$\theta$ lens 16 further has a distortion aberration so as to obtain a proportional relation between the deflection angle $\theta$ having the equal angular velocity and the scanning speed for recording or reading image on the surface 18 perpendicular to the optical axis. The f-$\theta$ lens 16 is designed to yield the relation of $Y = f \cdot \theta$ between the deflection angle $\theta$ and the height Y of formed image from the optical axis so that a uniform scanning speed can be always obtained.

As such conventional f-$\theta$ lenses, for example, the orthometer type whose first lens is positive a lens is disclosed in JP-A 55-53308 and the telecentric type is disclosed in JP-A 55-18613 and JP-A 51-37245.

When recording or scanning with a scanning length above 500 mm, in the case of the conventional telecentric type f-$\theta$ lens, an excellent aberration and a good spot may be obtained. However, since the lens diameter must be greater than the scanning length is, the dimensions of the lens become fairly large and this is unfitted for a practical use.

On the other hand, the orthometer type f-$\theta$ lens is a wide-angle lens in which the whole angle of view is about 60°. Therefore, even if the scanning length is long, the shape lens will be of compact, so that this lens is an optimum lens for the scanning system of a long scanning length. However, in the foregoing conventional constitution, when the scanning length is above 500 mm, astigmatism increases, so that there is a drawback such that the beam spot is not uniform in the scanning direction. On the contrary, even if the scanning length is below 500 mm, there are drawbacks such that image curvature in the sagittal direction is large and that when a spot diameter is below 21 $\mu$m, the beam spot is not uniform in the scanning direction at $1/e^2$ threshold level.

SUMMARY OF THE INVENTION

It is, therefore, an object of the present invention to solve the foregoing problems in the conventional techniques and to obtain an f-$\theta$ lens in which even in the case of long scanning length, image curvature in the sagittal direction is minimized and in which equal angular scanning velocity, high brightness, and high resolution are achieved.

To solve the foregoing problems, according to the present invention, there is provided a lens system formed of five lenses disposed in series and comprising a first positive meniscus lens whose concave surface is directed toward the incident side of a laser beam, a second negative meniscus lens whose concave surface is directed toward the incident side of the laser beam, and third to fifth positive meniscus lenses whose concave surfaces are directed toward the beam incident side, wherein these lenses satisfy the following conditions, respectively.

(1) $0.95 < |r_2/r_3| < 1.02$
(2) $0.007f < d_4 < 0.050f$
(3) $-0.5f > r_5 > -1.7f$
(4) $0.08f < |d_3/n_2 + d_4 + d_5/n_3 + d_6 + d_7/n_4 + d_8 + d_9/n_5| < 0.12f$ where, $r_2$, $r_3$, and $r_5$ denote radii of curvatures of the surface on the emission side of the first lens, surface on the incident side of the second lens, and surface on the incident side of the third lens, respectively; $d_3$, $d_5$, $d_7$, and $d_9$ denote thicknesses of the second, third, fourth, and fifth lenses, respectively; $n_2$, $n_3$, $n_4$, and $n_5$ indicate refractive indices of the second, third, fourth, and fifth lenses, respectively; $d_4$, $d_6$, and $d_8$ represent surface (air) distances between the second and third lenses, between the third and fourth lenses, and between the fourth and fifth lenses, respectively; and f is a focal distance of the whole lens system.

BRIEF DESCRIPTION OF THE DRAWINGS

FIGS. 3(a) to (c) are graphs showing aberration curves of the f-$\theta$ lens in the embodiment of the invention; and FIGS. 4(a) to 4(c) are graphs showing aberration curves of an f-$\theta$ lens in another embodiment of the invention.

DESCRIPTION OF THE PREFERRED EMBODIMENT

An embodiment of the present invention will be described hereinbelow.

Figure 1:
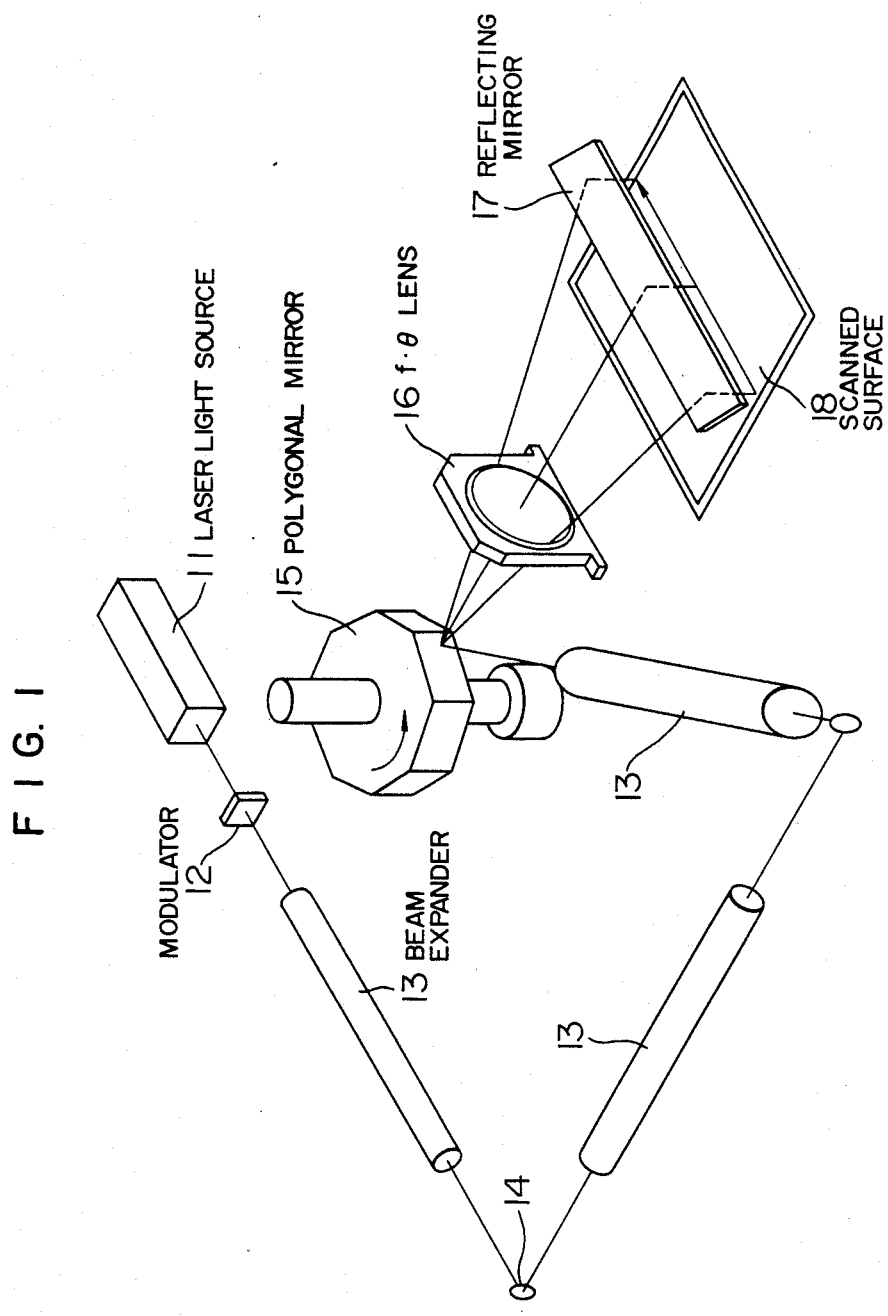
FIG. 1 is a perspective view showing a scan optical system to which an f-$\theta$ lens according to the present invention is applied.
Figure 2:
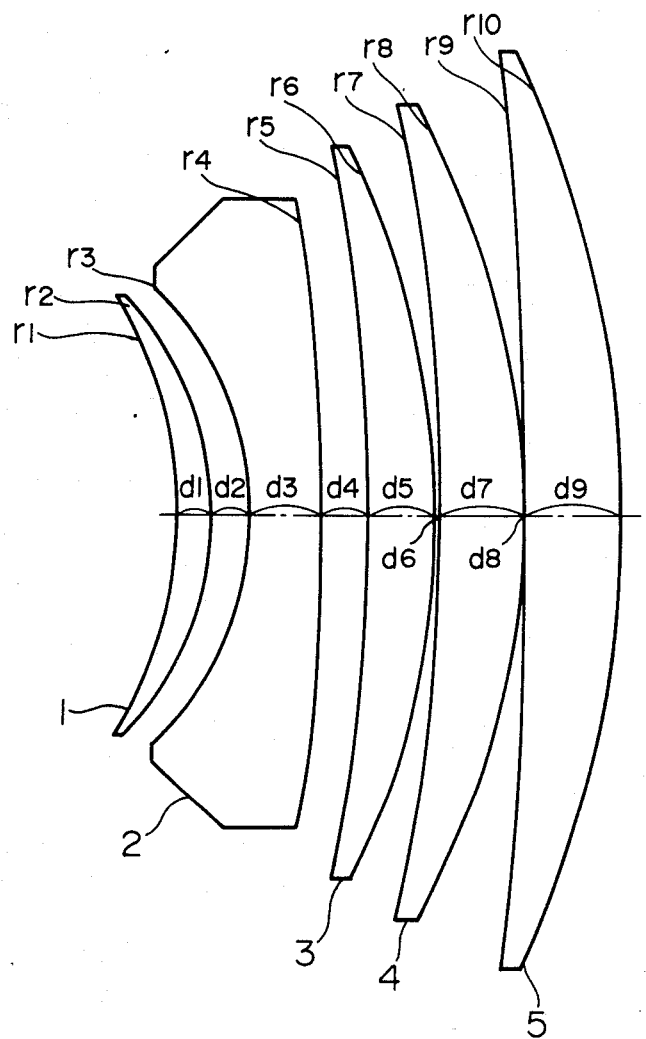
FIG. 2 is a cross sectional view of the f-$\theta$ lens in an embodiment of the invention.

FIG. 1 illustrates a fundamental arrangement of an f-$\theta$ lens of the invention. The f-$\theta$ lens of the invention has a constitution of five serially disposed lenses comprising first, third, fourth, and fifth lenses 1, 3, 4, and 5 which are positive meniscus lenses whose concave surfaces are directed toward the incident side of a laser beam and a second lens 2 which is a negative meniscus lens whose concave surface is directed toward the incident side of the laser beam. Lenses 1-5 satisfy the following conditions:

(1) $0.95 < |r_2/r_3| < 1.02$
(2) $0.007f < d_4 < 0.050f$
(3) $-0.5f < r_5 < -1.7f$
(4) $0.08f < |d_3/n_2 + d_4 + d_5/n_3 + d_6 + d_2/n_4 + d_8 + d_9/n_5| < 0.12f$ where, $r_2$, $r_3$, and $r_5$ denote radii of curvatures of the surface on the emission side of the first lens, surface on the incident side of the second lens, and surface on the incident side of the third lens, respectively; $d_3$, $d_5$, $d_7$, and $d_9$ indicate thicknesses of the second to fifth lenses, respectively; $n_2$, $n_3$, $n_4$, and $n_5$ represent refractive indices of the second to fifth lenses, respectively; $d_4$, $d_6$, and $d_8$ surface (air) distances between the second and the third lenses, between the third and fourth lenses, and between the fourth and fifth lenses; and f is a focal distance of the whole lens system.

The f·θ lens of the invention causes a negative distortion aberration as a feature of the f·θ lens and is designed in a manner such that the value of $D' = (Y' - f\theta)/f\theta$ indicative of the equal angular velocity scanning property is near zero, wherein f is the focal distance of the whole lens system, θ is the deflection angle, and Y' is a distance of the image formation position from the optical axis. Further, to obtain a spot diameter near the diffraction limit at a small F number, the spherical aberration is corrected to a good value. In addition, even if a focal depth is a small value, the inclination of the image in the sagittal direction is corrected so that the shape of spot becomes uniform in the scanning direction.

For this purpose, the f·θ lens of the invention is designed so as to satisfy the foregoing four conditions.

In condition (1): When the absolute value of $|r_2/r_3|$ exceeds the upper limit value 1.02, the spherical aberration becomes a value over the proper value, so that the image is inclined in the positive direction. On the contrary, when this absolute value becomes below the lower limit value of 0.95, the spherical aberration becomes a value which is too smaller than the proper value.

In condition (2): When $d_4$ exceeds the upper limit value of 0.050f, the meridional image is inclined in the positive direction and at the same time the higher astigmatism in the sagittal direction increases, so that an amount of image curvature increases. When $d_4$ is smaller than the lower limit value of 0.007f, the meridional image is inclined in the negative direction and the astigmatism in the sagittal direction increases and the distortion aberration decreases.

In the condition (3): When $r_5$ exceeds the upper limit value of $-1.7f$, the higher astigmatism in the sagittal direction increases and amount of image curvature increases. On the contrary, when $r_5$ is smaller than the lower limit value of $-0.5f$, the astigmatic difference between the astigmatisms in the meridional and sagittal directions increases and, further, the distortion aberration decreases.

In the condition (4), if the length in the case where the whole portion from $r_3$ to $r_{10}$ was replaced by air exceeds the upper limit value of 0.12f, amount of image curvature in the sagittal direction increases. When this length is smaller than the lower limit value of 0.08f, the distortion aberration decreases and the f·θ characteristics are not derived.

As described above, in the constitution of five groups and five pieces including the negative meniscus lens, the whole lens system is formed into a concentric shape for the diaphragm and the whole length of this lens system is set to a short value. Thus, even in the case of a long scanning length, the amount of image curvature in the sagittal direction can be minimized. In addition, the bright image having the equal angular velocity scanning property and high resolution can be obtained.

Practical examples are shown below.

| (Embodiment 1) | | |
|---|---|---|
| $r_1 = -0.14191$ | $d_1 = 0.011785$ | $n_1 = 1.63613$ |
| $r_2 = -0.11008$ | $d_2 = 0.014000$ | |
| $r_3 = -0.10999$ | $d_3 = 0.024934$ | $n_2 = 1.56459$ |
| $r_4 = -0.69993$ | $d_4 = 0.015998$ | |
| $r_5 = -0.65254$ | $d_5 = 0.023998$ | $n_3 = 1.61985$ |
| $r_6 = -0.29656$ | $d_6 = 0.001315$ | |
| $r_7 = -0.67047$ | $d_7 = 0.03000$ | $n_4 = 1.46300$ |
| $r_8 = -0.29104$ | $d_8 = 0.0004$ | |
| $r_9 = -1.65163$ | $d_9 = 0.0334$ | $n_5 = 1.49668$ |
| $r_{10} = -0.36443$ | | |

$f = 1$, F/23.7, $Y = 0.526$, $\lambda = 632.8$ nm
$|r_2/r_3| = 1.0008$
$|d_3/n_2 + d_4 + d_5/n_3 + d_6 + d_7/n_4 + d_8 + d_9/n_5| = 0.0913$ FIGS. 3(a) to (c) show the correction states of the spherical aberration, astigmatism, and distortion aberration in the above embodiment 1.

| (Embodiment 2) | | |
|---|---|---|
| $r_1 = -0.14778$ | $d_1 = 0.016187$ | $n_1 = 1.63613$ |
| $r_2 = -0.11102$ | $d_2 = 0.012378$ | |
| $r_3 = -0.10963$ | $d_3 = 0.011426$ | $n_2 = 1.57216$ |
| $r_4 = -0.48942$ | $d_4 = 0.034216$ | |
| $r_5 = -0.57131$ | $d_5 = 0.021900$ | $n_3 = 1.63613$ |
| $r_6 = -0.31700$ | $d_6 = 0.000952$ | |
| $r_7 = -0.77127$ | $d_7 = 0.036183$ | $n_4 = 1.51509$ |
| $r_8 = -0.29422$ | $d_8 = 0.000952$ | |
| $r_9 = -1.80914$ | $d_9 = 0.033136$ | $n_5 = 1.51509$ |
| $r_{10} = -0.48847$ | | |

$f = 1$, F/23.06, $Y = 0.526$, $\lambda = 632.8$ nm
$|r_2/r_3| = 1.0127$
$|d_3/n_2 + d_4 + d_5/n_3 + d_6 + d_7/n_4 + d_8 + d_9/n_5| = 0.1025$ FIGS. 4(a) to (c) show the correction states of the spherical aberration, astigmatism, and distortion aberration of the embodiment 2.

As described above, according to the invention, in the constitution of five groups and five pieces including the negative meniscus lens, the lens system is formed into a concentric shape for the diaphragm and the whole length of the lens system is set to a short value. Thus, even in the case of a long scanning length, the amount of image curvature in the sagittal direction can be minimized. In addition, the bright image having the equal angular velocity scanning property and high resolution can be derived.

What is claimed is:

1. An f·θ lens comprising a lens system comprising five lenses disposed serially including a first positive meniscus lens whose concave surface is directed toward the incident side of a light beam, a second negative meniscus lens whose concave surface is directed toward the incident side of the light beam, and third, fourth, and fifth positive meniscus lenses whose concave surfaces are directed toward the incident side of the light beam, wherein said first to fifth lenses satisfy the following respective conditions:
(1) $0.95 < |r_2/r_3| < 1.02$
(2) $0.007f < d_4 < 0.050f$
(3) $-0.5f < r_5 < -1.7f$
(4) $0.08f < |d_3/n_2 + d_4 + d_5/n_3 + d_6 + d_7/n_4 + d_8 + d_9/n_5| < 0.12f$ (wherein, $r_2$, $r_3$, and $r_5$ respectively denote radii of curvatures of a surface on the emission side of the first lens, a surface on the incident side of the second lens, and a surface of the incident side of the third lens; $d_3$, $d_4$, $d_7$ and $d_9$ respectively indicate thicknesses of the second to fifth lenses; $n_2$, $n_3$, $n_4$, and $n_5$ repectively represent refractive indices of the second to fifth lenses; $d_4$, $d_6$ and $d_8$ respectively denote surface distances between the second and third lenses, between the third and fourth lenses, and between the fourth and fifth lenses; and f is a focal distance of the lens system as a whole).

2. An f·θ lens according to claim 1, wherein a value of $(Y' - f\theta)/f\theta$ is near zero, in which θ is a deflection angle and Y' is a distance of the image formation position from the optical axis.

* * * * *